June 25, 1935.    J. F. WALSH    2,005,814
MIRROR
Filed April 26, 1929
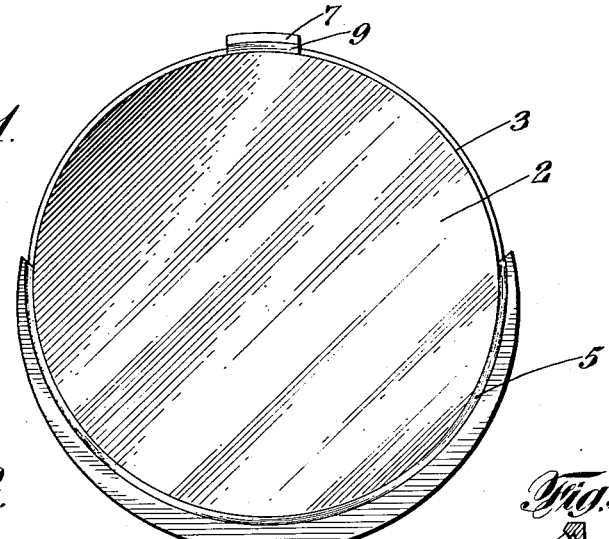
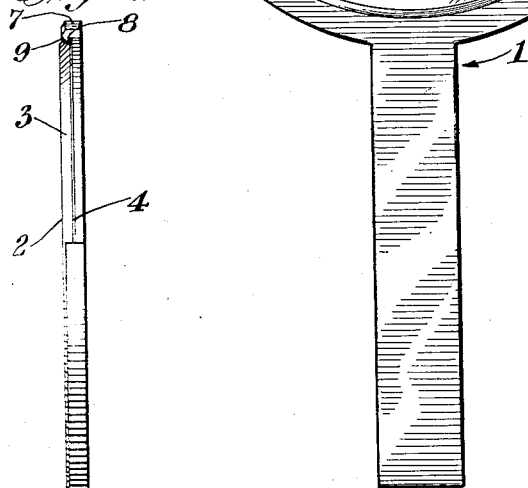
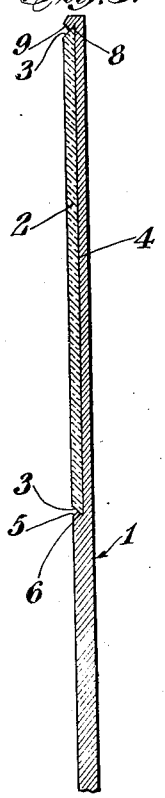
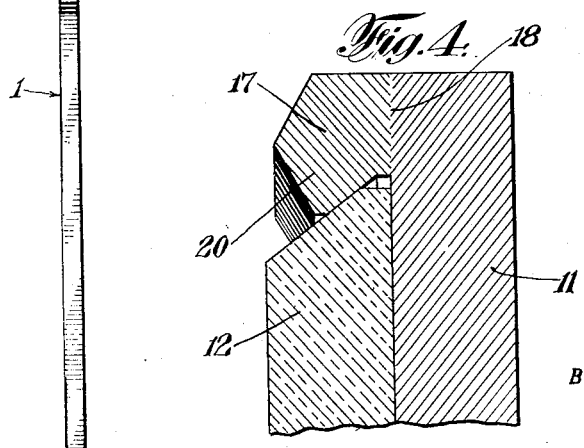
INVENTOR.
James F Walsh
BY Hugo G. Kennman
ATTORNEY.

Patented June 25, 1935

2,005,814

UNITED STATES PATENT OFFICE 2,005,814

MIRROR

James F. Walsh, South Orange, N. J., assignor to Celluloid Corporation, a corporation of New Jersey Application April 26, 1929, Serial No. 358,215

2 Claims. (Cl. 88—102)

This invention pertains to the general class of means for holding objects in frames, and particularly to means for facilitating the insertion and securing of the glass portion of a hand mirror in the backing for same.

Hand mirror frames are generally made of thermo-plastic materials, such as those known as celluloid, pyralin, and other cellulosic plastics. The frames for such mirrors are ordinarily formed with a recessed portion of the shape of the reflecting glass. In some instances, the side walls of such recessed portion are under-cut or bezeled to accommodate the beveled portion of the glass, or in other words the beveled edges thereof. To mount the glass in such frames, it is necessary to heat the frame to a plastic condition, whereupon the glass is either molded or sprung into place The under-cut portion or bezel is then formed about the edges of the glass. This method, of course, entails special equipment, and skilled operators, as well as considerable care in order to avoid an excessively large number of rejects.

Another method of holding the glass portion in the frame is to make the recessed portion large enough to accommodate the glass without molding or springing same into the recess. The glass is then placed in the recess and held in position by cementing a strip of material to the walls of the recess and over the edges of the glass. This method not only consumes a great deal of time in cementing the strips in place, which in many instances cannot be done satisfactorily, but also produces a patched or welded effect with the result that this process is generally used to produce lower grade articles only.

An object of the invention, therefore, is the provision of means whereby the reflecting glass portion of a mirror may be mounted in place in a minimum number of operations.

A further object of the invention is the provision of means whereby the reflecting glass may be mounted in a mirror frame with a minimum amount of heating, molding, springing, and/or cementing.

A further object of the invention is to provide a hand mirror that is relatively easy to manufacture, that has a relatively superior finish and ornamental appearance, that is durable, serviceable, and of long lasting qualities.

Many other objects and advantages will become apparent to persons skilled in the art as the specification proceeds.

The invention comprises forming the holding recess of a mirror or other article with an under-cut or bezeled side wall surrounding only a portion thereof. Bordering the recessed portion opposite the side wall portion, an under-cut or bezeled lug is positioned. This lug may either be integral with the frame or may be cemented thereto, after the glass portion or other object is in place.

To mount the glass or other object it is merely necessary to insert the edge thereof into the under-cut portion of the side wall, and then either mold or snap the under-cut integral lug over the opposite edge or cement a lug to the frame after the glass or other object has been slid into position, as the case may be.

To this end, my invention consists in the novel construction and arrangement of parts and the method set forth.

In the drawing, wherein like reference characters represent like parts in the various figures Figure 1 is an elevation of a hand mirror, showing the glass in place.

Figure 2 is a side view.

Figure 3 is a longitudinal section showing the glass in place.

Figure 4 shows a modification of the lug for holding the glass or other object in place.

At 1, in Figure 1, is shown a frame of a hand mirror having a reflecting glass 2 mounted therein. The term "frame" is intended to include any structure of any size or shape suitable for my purposes. The glass 2 is shown circular. However, it is obvious that same may be of any shape or contour. The edge 3 of the glass 2, is preferably beveled as shown. However, the invention is not limited to any particular shape or form of the edge 3. Same may be of any form or shape whatsoever, without departing from the spirit of this invention.

The glass 2 rests within the so-called recessed portion 4 of the frame 1. The term "recess" is used to indicate the portion upon which the mirror or other object rests, which may or may not be submerged. A side wall 5, bordering one side of the recess 4, is preferably integral with the frame 1. The side wall 5 is of such length, that the edge 3 of the mirror 2 can be slid into the under-cut groove 6 thereof. In the case of a circular mirror, the side wall portion 5 of course, is not greater than a semi-circle.

Bordering the recess 4, opposite the side wall 5, is a lug 7, which is preferably under-cut as shown at 8.

When the glass 2 is in place the edge 3 thereof rests in the under-cut portion 8 of the lug 7. The glass is then held snugly in place by means of the side wall 5 and the lug 7.

To insert the glass 2 it is merely necessary to slide the edge 3 into the under-cut portion 6 of the side wall 5, and then snap the lug 7 over the opposite edge of the glass 2.

This can generally be effected with ease and without warming the lug 7, particularly if the edge 9 of the lug 7 is slightly beveled, as shown. The material of which hand mirrors are made is generally sufficiently elastic to permit this snapping into place. However, if the material shows resistance, or if preferred, the lug 7 may be warmed on a hot plate or by other suitable means.

The saving in time, made possible by this novel construction is of great magnitude, resulting in large savings in quantity production. The structure is not only ornamental to a certain degree in itself, but permits of any desired degree of further ornamentation.

In Figure 4, is shown a modification which may be preferred in some instances, particularly in those cases where the stock is of considerable thickness, or is relatively in-elastic or non-thermo-plastic. However, it is to be understood that the modification shown in Figure 4 may be used with any kind of material.

The frame 11 is formed in the same manner as the frame 1, except that the lug 7 of frame 1 is omitted. The glass 12 is held in place by cementing a lug 17 to the frame 11. When cellulosic plastic materials are employed this cement is composed chiefly of compatible solvents for the materials used; thus resulting in a welding of the lug 17 to the frame 1 along the imaginary line 18. Such cements are well known in the art. The lug 17 has an extended portion 20 which engages the edge 13 of the glass 12, and holds same in place.

This invention may obviously be applied to many other objects, such as picture frames, panels, instrument cases, vanity cases, etc., to hold glass or any other material.

Having described my invention, it will be obvious that many variations may be made in the same within the scope of the claims without departing from the spirit thereof.

I claim:

1. A frame for mirrors and other articles comprising a supporting base having an undercut rim adapted to engage part only of the periphery of said article and an undercut lug adapted to engage a portion of the remainder of said periphery and resiliently carried by said base whereby the article may be snapped past the lug and into position on said base.

2. A frame for mirrors and other articles comprising a supporting base having an undercut rim adapted to engage part only of the periphery of said article, said base having a resilient extension, and an undercut lug carried by said extension and adapted to engage a portion of the remainder of said periphery whereby the article may be snapped past the lug and into position on said base.

JAMES F. WALSH.